United States Patent [19]

Ozawa et al.

[11] Patent Number: 4,876,568
[45] Date of Patent: Oct. 24, 1989

[54] FOCUSING METHOD FOR PRINTER

[75] Inventors: Yoshio Ozawa; Takashi Yamamoto; Takao Shigaki; Rokusaburo Kaneko, all of Kanagawa, Japan

[73] Assignee: Fuji Photo Film Co., Ltd., Kanagawa, Japan

[21] Appl. No.: 210,950

[22] Filed: Jun. 24, 1988

[30] Foreign Application Priority Data

Jul. 10, 1987 [JP] Japan ................. 62-172381

[51] Int. Cl.⁴ .............................. G03B 27/34
[52] U.S. Cl. ........................... 355/56; 355/77
[58] Field of Search ............. 355/55, 56, 77, 58, 355/59; 250/201 AF, 201 PF

[56] References Cited

U.S. PATENT DOCUMENTS

| | | | |
|---|---|---|---|
| 3,832,058 | 8/1974 | Gusovius | 355/56 |
| 4,451,142 | 5/1984 | Takenaka et al. | 355/55 |
| 4,585,338 | 4/1986 | Nitsch et al. | 355/56 |
| 4,627,721 | 12/1989 | Nguyen et al. | 355/55 X |
| 4,643,562 | 2/1987 | Kaneko et al. | 355/56 |
| 4,806,988 | 2/1989 | Verner | 355/55 |

Primary Examiner—L. T. Hix
Assistant Examiner—D. Rutledge
Attorney, Agent, or Firm—Sughrue, Mion, Zinn, Macpeak & Seas

[57] ABSTRACT

Disclosed is a focusing method for a printer which comprises the steps of: calculating a lens position and a conjugate distance at a set magnification value on the basis of an equation, changing the lens position within a predetermined range including the calculated lens position which serves as an original position, and conducting printing at each of these lens positions, selecting a lens position which provides an optimal focusing, correcting the equation using the selected lens position and the actual magnification employed when the selection is made, and calculating a lens position and a conjugate distance at another magnification value using the equation corrected when the selected lens position coincides with the original position and then changing the lens position and the conjugate distance accordingly.

15 Claims, 3 Drawing Sheets

FOCUSING METHOD FOR PRINTER

BACKGROUND OF THE INVENTION

1. Field of the Invention:

The present invention relates to a focusing method for use in a printer in which a magnification is determined for printing by varying a lens position and a conjugate distance.

2. Description of Prior Art:

Photographic film is of various kinds, such as 35 mm film, brownie film, 110 film, and so on. Photographic film is also classified as being either full-size film or half-size film. In order to deal with these types of photographic film, a printing apparatus is known in which the magnification for printing is varied by moving a lens and by changing the conjugate distance of an optical path. The amount of lens movement and the conjugate distance can be calculated using an AF (auto-focus) curve that is adopted in the form of equations. Such an AF curve is conventionally obtained in the following manner.

As schematically shown in FIG. 3, a negative film 60 is illuminated by a light source (not shown), and the light transmitted through the film is irradiated on a printing paper 64 through a lens 62, by which means printing is performed. A first lens formula (which expresses the relationship between the object point, the image point and the focal point) holds as follows:

$$\frac{1}{A} + \frac{1}{S - A} = \frac{1}{f} \quad (1)$$

where A is the distance between the film, S is the conjugate length, and f is the focal point of the lens.

Next, a magnification value m1 is assigned. When the lens is focused with the assigned magnification m1, the following equation is obtained from Equation (1).

$$\frac{1}{Ap + A'm2} + \frac{1}{Sp + S'm2 - (Ap + A'm2)} = \frac{1}{f} \quad (2)$$

Then, a magnification m2 is assigned. When the lens is focused with the assigned magnification m2, the following equation holds.

$$\frac{1}{Ap + A'm2} + \frac{1}{Sp + S'm2 - (Ap + A'm2)} = \frac{1}{f} \quad (3)$$

where Ap is the distance between the negative film and the lens reference point (a corrected value), A' is the distance between the lens reference point and the lens position, Sp is the distance between the negative film and the printing paper reference point (a corrected value), S' is the distance between the printing paper reference point and the printing paper position, A' m1 and S' m1 are A' and S' at the magnification m1, and A' m2 and S' m2 are A' and S' at the magnification m2.

A' and S' are obtained by actually measuring the distances (using, for example, the number of pulses of a pulse motor), and Ap and Sp are obtained by the calculation of Equation (1) when the lens is focused.

Since A' m1, S' m1, A' m2 and S' m2 represent distances from the reference points and are therefore known whereas the focal point f is determined by a lens, Ap and Sp can be obtained from Equations (2) and (3).

Since Ap and Sp are calculated using the above-described Equations, if either Ap or Sp is determined, the other Ap or Sp can be easily obtained from the following equation.

$$\frac{1}{Ap + A'} + \frac{1}{Sp + S' - (Ap + A')} = \frac{1}{f} \quad (4)$$

In a normal printing apparatus, magnification as well as focusing must be accurate. Therefore, in an actual printing operation, it is essential that accurate focusing is provided when a magnification value is input.

In other words, even though it is considered that the lens is focused if the amount of blur is within a certain tolerance in terms of the circle of confusion, the magnification is varied even when the lens is focused, and focusing that has been varied by assigning a certain magnification value must therefore be corrected.

Thus, A' and S' at a certain magnification are calculated by the following procedure.

First, a second lens formula (which expresses the magnification) holds as follows:

$$\frac{S - A}{A} = m \quad (5)$$

Am and Sm are obtained from the following equations as in the case where the focusing is obtained.

$$\frac{Sm + S'm1 - (Am + A'm1)}{Am + A'm1} = m1 \quad (6)$$

$$\frac{Sm + S'm2 - (Am + A'm2)}{Am + A'm2} = m2 \quad (7)$$

Since Am and Sm are calculated using Equations (6) and (7), if Am or Sm is determined, the other Am or Sm can be obtained from the following equation.

$$\frac{Sm + S' - (Am + A')}{Am + A'} = m \quad (8)$$

A' and S' are obtained from simultaneous equations in respect of Equations (4) and (8).

The above-described focusing operation is repeated so as to obtain optimum values for Ap, Sp, Am and Sm, and the thus-obtained values are stored in a memory of a control section, by which A' and S' which ensures focusing at a certain magnification m can be easily obtained by inputting that magnification.

However, in the above-described focusing method, since an operator moves the lens in the vicinity of its focal point by operating a fine adjusting screw mounted on a lens holder, the adjustment range differs for each operator. Therefore, it is difficult for the operator to move the lens to a selected optimum focused position, and the operation is inefficient. Further, it is required that focusing be visually checked by projecting an image. However, visual checking is impossible with a so-called erect type printing apparatus in which the negative film is located above the printing paper, and application of such a focusing method is therefore limited to what is called an inverted-type printing apparatus. In addition, when the image of a negative film is to be projected, accurate visual checking is impossible due to the low level of illumination of the image.

SUMMARY OF THE INVENTION

In view of the above-described problems of the prior art, an object of the present invention is to provide a focusing method for a printer which can be applied to any type of printer and which is capable of alleviating the burden of an operator.

To this end, the present invention provides a focusing method for a printer which comprises the steps of calculating a lens position and a conjugate distance at a predetermined magnification value on the basis of an AF curve that expresses the lens position and the conjugate distance, varying the lens position within a predetermined range including the lens position which is obtained by the calculation and which serves as an original position and conducting printing at each of these lens positions, selecting a lens position which ensures an optimum focusing, correcting the AF curve using the selected lens position and the actually employed magnification, and calculating the lens position and the conjugate distance at another magnification value using the AF curve obtained when the selected lens position coincides with the original position.

First, a particular magnification is selected, and a lens position at that magnification value is calculated from the AF curve. Next, the lens is located at a plurality of lens positions within a predetermined range including the calculated lens position which serves as an original position, and printing is conducted at each of these lens positions.

Subsequently, the AF curve is corrected on the basis of the lens position which has ensured the optimum focusing an the magnification value which has been actually employed at that time.

The above-described process is repeated until the selected lens position coincides with the original position so as to obtain a true AF curve. In consequence, when another magnification value is selected, printing operation can be conducted in an optimally focused state by moving the lens to a position calculated on the basis of the thus-obtained true AF curve.

In the present invention, after printing has been conducted at each of the plurality of lens positions including the original position, the lens position which has ensured the optimum focusing is selected. Therefore, the focusing method according to the present invention can be applied to both so-called erect type and inverted type printing apparatuses.

Further, what an operator has to do is to solely input a code representing the selected lens position as well as the magnification value after the selection has been conducted, and the workability is therefore improved.

It is preferable that the above-described printing operation is conducted at a plurality of magnification values. If two different magnification values are to be employed, the larger the difference between these magnification values is, the better.

BRIEF DESCRIPTION OF THE DRAWINGS

FIG. is a schematic view of a printing apparatus to which the present invention is applied;

FIG. is a flowchart, showing a focusing procedure; and

FIG. is a schematic view of a printing apparatus, illustrating a focusing method.

DESCRIPTION OF THE PREFERRED EMBODIMENT

Figure 1:
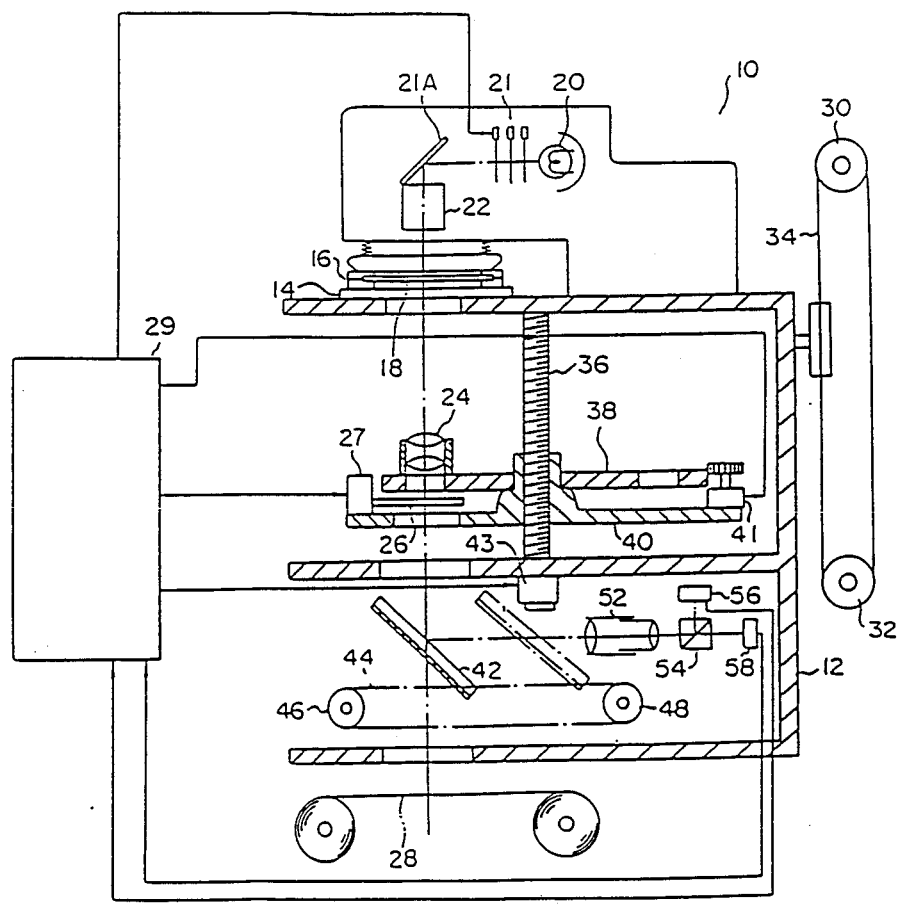

FIG. 1 shows an erect type photographic printing apparatus 10 to which the present invention is applied. A negative film carrier 16 is provided on a base plate 14 of a housing 12, and a negative film 18 is loaded in the negative film carrier 16.

A light source 20, a YMC filter 21, a mirror 21A and a light diffusing cylinder 22 are housed in the housing 12 in a coaxial fashion so as to transmit the light from the light source to a printing paper 28 through a lens 24 and a shutter 26. The shutter 26 is driven by a control signal sent thereto from a control device 29 through a driver 27. The YMC filter 21 is also advanced to and retracted from the optical axis by a control signal from the control device 29.

The housing 12 is mounted on part of a belt 34 wound around pulleys 30 and 32 in such a manner that it can be moved in the vertical direction as viewed in FIG. 1 when the pulleys 20 and 32 ar driven by a motor (not shown).

The lens 24 is mounted on a turret 38 which is in turn mounted on an elevator 40 supported by the housing 12 through a screw shaft 36. The turret 38 is rotated by a motor 41 mounted on the elevator 40 so as to align any of the lenses on the optical axis. When the screw shaft 36 is rotated by a motor 43, the elevator 40 whose rotation is inhibited is moved up and down together with the turret 38, by which means the position of the lens 24 is changed.

Within the housing 12 is disposed a reflecting mirror 42. Part of the mirror 42 is attached to a belt 44 which is wound around pulleys 46 and 48. When the pulleys 46 and 48 are rotated by a motor (not shown), the mirror 42 is moved rightward and leftward as viewed in FIG. 1, by which it is advanced toward and retracted from the optical axis.

The mirror 42 is adapted to reflect the light from the light source 20, and the reflected light is transmitted to a pair of image sensors 56 and 58 through a zoom lens 52 and a beam splitter 54. A negative image having a size which corresponds to that of the negative film is formed on each of the image sensors 56 and 58 by the zoom lens 52 so as to enable the density of each point of the image to be measured by the scanning of the image sensor 56 or 58. The obtained data is supplied to the control device 29 where it is used to calculate the exposure time.

In the printing apparatus of this embodiment, the housing 12 is located at each of the high and low magnification positions before a series of printing operations begins so as to correct a predetermined equation (the AF curve) which expresses the lens position and the conjugate distance. More specifically, after the lens 24 has been determined, the lens is focused by driving the motor 43 on the basis of the lens position and the conjugate distance obtained from the AF curve.

The control device 29 contains the data which represents a focusing pitch for fine adjustment. The control device 29 positions the elevator 40 at nine positions including the lens position at which the lens is focused and which serves as an original position, the four positions being located above the original position and the other four positions being located below the original position, and performs printing at each of these nine positions. At this time, a number starting from 1 is appended to the rear surface of the printing paper 28 by a printer (not shown), the number 1 being appended to a print obtained when the lens is located at the lowest position (as viewed in FIG. 1), and the number increasing as the position of the lens rises. The number appended to each of the prints can be made to correspond to the lens position by the control device 29 (the original position being designated by the number 5).

The operator conducts the above-described printing operation at each of the high and low magnification positions. The operator selects the optimally focused position for each of the two magnification positions, and then inputs the numbers appended to the selected prints 28 to the control device 29. The control device 29 corrects the AF curve on the basis of the selected focused positions. Correction of the AF curve is repeated until the numbers representing the selected focused positions coincide with the number representing the original position (which is designated by the number 5) so as to obtain a true AF curve.

The operation of the embodiment will now be described.

In a normal printing operation, the light emitted from the light source 20 is diffused by the light diffusing cylinder 22, and the diffused light illuminates the negative film 18. The light transmitted through the negative film 18 passes through the opening of the turret 38, and is then reflected sideways by the mirror 42. The reflected light passes through the zoom lens 52, is divided into two parts by the beam splitter 54, and the split rays of light are made incident to the image sensors 56 and 58, respectively. A negative image having a size which corresponds to that of the negative film is formed on each of the image sensors 56 and 58 by the zoom lens 52 so as to enable the density of each of the points in the image to be measured.

The photographic density of each of the points forming the negative image is measured by the image sensors 56 and 58, and the thus-obtained values are used to calculate the exposure time for printing.

In order to conduct printing, a lens 24 which is suited to the printing magnification is aligned on the optical axis by the rotation of the turret 38 which is achieved by driving the motor 41. At the same time, the mirror 42 is moved rightward as viewed in FIG. 1 and is retracted from the optical axis. Thereafter, the image carried on the negative film is printed on the printing paper 28 by the opening of the shutter 26 for a period which corresponds to the exposure time.

The printing magnification is changed by operating a printing magnification assigning key (not shown). A lens position and a conjugate distance which correspond to the assigned printing magnification are calculated using the AF curve, and the turret is accordingly moved up or down by the rotation of the screw shaft 36. At the same time, the housing 12 is moved up or down through a predetermined distance by the driving of the belt 34 so as to change the distance between the negative film 18 and the lens 24, i.e., the conjugate distance of the printing optical path.

Figure 2:
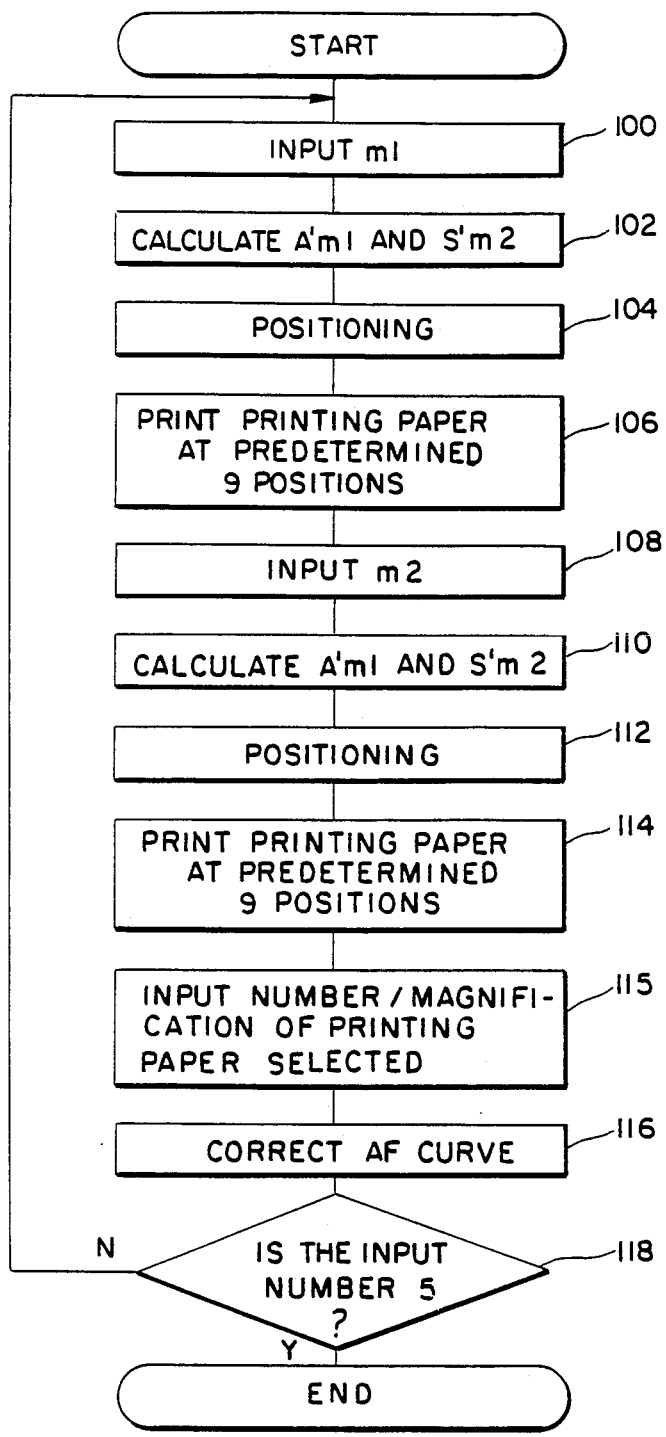
Figure 3:
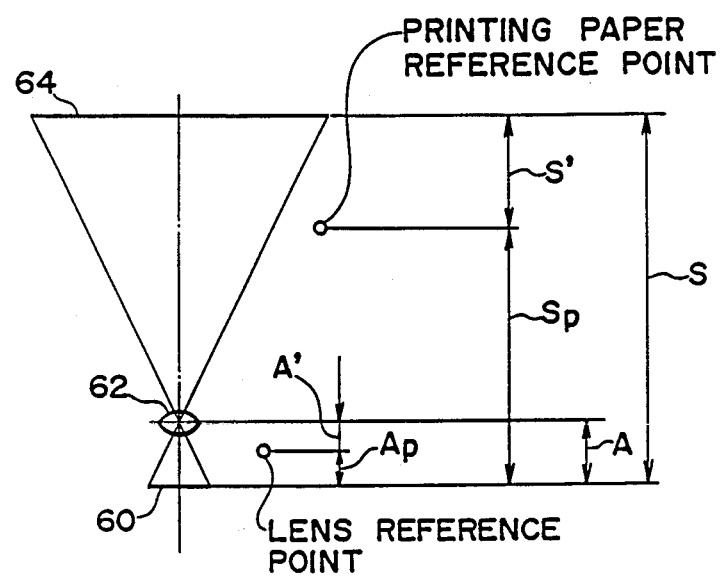

Before the above-described printing operation is conducted, an AF curve that determines the lens position and the conjugate distance which correspond to a desired magnification value must be corrected so as to obtain a true AF curve. How to determine the true AF curve will be described below with reference to the flowchart of FIG. 2.

In step 100, a high magnification value m1 is input, and A' m1 and S' m1, which correspond to the input magnification value m1, are obtained from the AF curve in step 102. Next, in step 104, the lens position and the conjugate distance are adjusted on the basis of the values obtained in step 102.

Thereafter, in step 106, the lens is moved downward as viewed in FIG. 1 by a distance which is four times the stored pitch, and printing is conducted at that position. Next, the lens is moved upward as viewed in FIG. 1 by the stored pitch, so that printing is conducted at each of a total of nine positions. At this time, a number starting from 1 is appended to the printing paper by a printer.

Next, in step 108, a low magnification value m2 is input. In step 110, A' m2 and S' m2, which correspond to the input magnification value m2, are calculated from the AF curve. Thereafter, in step 112, the lens position and the conjugate distance are adjusted on the basis of the values obtained in step 110. Subsequently, in step 114, printing is conducted at a total of nine positions, as in step 106. At this time, a number which starts from 1 is also appended to the printing paper. Input of the high and low magnification values may also be conducted automatically.

In step 115, an operator chooses the print which is focused optimally from each of two sets of prints (consisting of nine prints for the high magnification and nine prints for the low magnification), and then inputs the number appended to that print and the magnification. Which magnification value the input number represents may be determined by the order of input, or the number may be input together with the magnification value.

In step 116, the AF curve is corrected on the basis of the lens positions and the magnification values which correspond to the input numbers. Subsequently, in step 118, it is determined whether or not the input number is 5 which represents the original position. If the answer is negative, the process returns to step 100, by which the above-described processings (from step 100 to step 116) are repeated. This means that an original position of the lens 24 is calculated from the AF curve corrected in a preceding process. The above-described processings are repeated until the print 28 printed when the lens is located at the original lens position calculated from the AF is focused optimally. This can be easily judged from the fact that the number input in step 118 equals 5.

Thus, a true AF curve is obtained by correcting the AF curve when the images on the prints 28 printed when the lens is located at the original position are optimally focused at the high and low magnification values. The thus-obtained true AF curve ensures printing at the optimally focused position in a normal printing operation.

As will be understood from the foregoing description, the focusing method according to the present invention can be applied to any type of printing apparatus. Further, it can alleviate the burden of the operator.

What is claimed is:

1. A focusing method for a printer in which a lens is disposed between a photographic film and a printing paper, in which the conjugate distance between said photographic film and said printing paper as well as the lens position are changeable, and in which focusing is provided for printing by changing said conjugate distance and said lens position in accordance with a magnification value, comprising the steps of:

(a) calculating said lens position and said conjugate distance at a previously selected magnification value on the basis of an equation which expresses a lens position and a conjugate distance which ensures focusing in accordance with a magnification value;

(b) changing the lens position within a predetermined range including the calculated lens position which serves as an original position, and conducting printing at each of these lens positions;

(c) selecting a lens position which provides an optimal focusing;

(d) correcting said equation using the selected lens position and the actual magnification employed when the selection is made; and (e) calculating a lens position and a conjugate distance at an-other magnification value using the equation corrected when the selected lens position coincides with said original position, and then changing the lens position and the conjugate distance accordingly.

2. A focusing method for a printer according to claim 1, wherein said printer includes a memory for storing said equation expressing the lens position and the conjugate distance which provide focusing in accordance with a magnification value, an operating section for calculating the lens position and the conjugate distance which correspond to an input magnification value on the basis of said equation stored in said memory when said magnification value is input, and a control section for automatically positioning said lens and said photographic film or said printing paper on the basis of the calculated result.

3. A focusing method for a printer according to claim 1, wherein said printer is arranged such that said photographic film is disposed in the upper portion, and that said printing paper is disposed in the lower portion.

4. A focusing method for a printer according to claim 2, wherein said printer is arranged such that said photographic film is disposed in the upper portion, and that said printing paper is disposed in the lower portion.

5. A focusing method for a printer according to claim 1, wherein said actual magnification is determined by measuring the dimension of said photographic film and that of the printed image.

6. A focusing method for a printer according to claim 1, wherein in said step (c), the lens position which corresponds to the optimally focused image is selected by observing the image printed on said printing paper.

7. A focusing method for a printer according to claim 1, wherein in said step (d), said equation is automatically corrected by the input of the selected lens position and the actual magnification value employed when the selection is made.

8. A focusing method for a printer according to claim 1, wherein when the lens position selected in said step (c) does not coincide with said original position, said steps (a) to (c) are repeated on the basis of the equation corrected by said step (d) until said lens position coincides with said original position.

9. A focusing method for a printer according to claim 2, wherein when the lens position selected in said step (c) does not coincide with said original position, said steps (a) to (c) are repeated on the basis of the equation corrected by said step (d) until said lens position coincides with said original position.

10. A focusing method for a printer according to claim 1, wherein said equation is corrected on the basis of the lens positions selected at a plurality of different magnification values and the actual magnification values employed when the selections are made.

11. A focusing method for a printer according to claim 8, wherein said plurality of magnification values comprise those respectively set at a point in the vicinity of a high magnification and at a point in the vicinity of a low magnification within the changeable magnification range.

12. A focusing method for a printer according to claim 1, wherein said lens position is changed by a pitch selected from a plurality of predetermined pitches.

13. A focusing method for a printer according to claim 1, wherein said lens position is changed by a desired pitch.

14. A focusing method for a printer according to claim 1, wherein when said lens position is changed, said lens is located at the same number of positions on the low and high magnification sides, with said original position serving as a center.

15. A focusing method for a printer according to claim 1, wherein said equation comprises:

$$\frac{1}{Ap + A'} + \frac{1}{sp + S' - (Ap + A')} = \frac{1}{f}$$

$$\frac{Sm + S' - (Am + A')}{Am + A'} = m$$

where Ap is the distance between the previously stored photographic film and the lens reference point, Sp is the distance between the previously stored photographic film and the printing paper reference point, Am is the distance between the previously stored lens having a magnification of m and the photographic film, Sm is a conjugate distance of a previously stored magnification m, S' is the distance between the printing paper reference point and the printing paper position, A' is the distance between the lens reference point and the lens position, f is the focal point of the lens, and m is a magnification value.

* * * * *